United States Patent
Santra et al.

(10) Patent No.: US 12,552,978 B2
(45) Date of Patent: *Feb. 17, 2026

(54) METHOD OF REACTING CO2 BY EMULSIFYING CONCRETE AND USE IN OILWELL CEMENTING

(71) Applicant: ARAMCO SERVICES COMPANY, Houston, TX (US)

(72) Inventors: Ashok Santra, The Woodlands, TX (US); Peter Boul, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 698 days.

This patent is subject to a terminal disclaimer.

(21) Appl. No.: 17/821,438

(22) Filed: Aug. 22, 2022

(65) Prior Publication Data

US 2024/0059951 A1 Feb. 22, 2024

(51) Int. Cl.
C09K 8/46 (2006.01)
B28B 1/00 (2006.01)
(Continued)

(52) U.S. Cl.
CPC ............... *C09K 8/46* (2013.01); *B28B 1/001* (2013.01); *B33Y 40/10* (2020.01); *B33Y 70/00* (2014.12);
(Continued)

(58) Field of Classification Search
CPC .. C09K 8/46; C09K 8/467; C04B 7/00; C04B 7/02; C04B 14/06; C04B 14/04;
(Continued)

(56) References Cited

U.S. PATENT DOCUMENTS

| 5,307,876 A | 5/1994 | Cowan et al. |
| 6,626,991 B1 * | 9/2003 | Drochon ............... C09K 8/473 106/676 |

(Continued)

FOREIGN PATENT DOCUMENTS

| CN | 113733352 A | 12/2021 |
| EP | 1142629 A1 | 10/2001 |

(Continued)

OTHER PUBLICATIONS

International Search Report and Written Opinion Issued in Related Application No. PCT/US2023/030847, mailed on Dec. 15, 2023, 15 pages.

(Continued)

*Primary Examiner* — Amber R Orlando
*Assistant Examiner* — Sarah Catherine Case
(74) *Attorney, Agent, or Firm* — Osha Bergman Watanabe & Burton LLP

(57) ABSTRACT

A concrete emulsion comprising a cement, aggregate, water, and carbon dioxide is provided. The carbon dioxide may be liquid or supercritical and is dispersed in the concrete emulsion composition. A method of producing a concrete emulsion composition is also provided. The method includes mixing a cement, aggregate, and water to form a hydrated concrete composition, and emulsifying the hydrated concrete composition with liquid or supercritical $CO_2$. An article comprising the concrete emulsion composition is provided. Further, a method of treating a wellbore comprising producing a concrete emulsion composition and pumping the concrete emulsion composition into a wellbore, and a method of manufacturing an article comprising producing a concrete emulsion composition and 3D printing the concrete emulsion composition are also provided.

25 Claims, 3 Drawing Sheets

(51) Int. Cl.
  *B33Y 40/10* (2020.01)
  *B33Y 70/00* (2020.01)
  *C04B 14/06* (2006.01)
  *C04B 28/02* (2006.01)
  *C04B 40/00* (2006.01)
  *C04B 40/02* (2006.01)
  *E21B 33/13* (2006.01)
  *C04B 103/00* (2006.01)
  *C04B 111/00* (2006.01)

(52) U.S. Cl.
  CPC .............. *C04B 14/06* (2013.01); *C04B 28/02* (2013.01); *C04B 40/0025* (2013.01); *C04B 40/0046* (2013.01); *C04B 40/0236* (2013.01); *E21B 33/13* (2013.01); *C04B 2103/0029* (2013.01); *C04B 2111/00146* (2013.01); *C04B 2111/00181* (2013.01)

(58) Field of Classification Search
  CPC ......... C04B 14/02; C04B 28/00; C04B 28/02; C04B 40/0025; C04B 2103/0029; C04B 22/10; C04B 40/0231; C04B 2111/00146; C04B 2111/00181; C04B 40/00; B28B 1/001; B33Y 40/10; B33Y 70/00; E21B 33/13
  See application file for complete search history.

(56) References Cited

U.S. PATENT DOCUMENTS

| | | |
|---|---|---|
| 6,874,578 B1 | 4/2005 | Garnier et al. |
| 2001/0023655 A1 | 9/2001 | Knopf et al. |
| 2008/0099200 A1 | 5/2008 | Wilson |
| 2010/0313793 A1 | 12/2010 | Constantz et al. |
| 2012/0090841 A1 | 4/2012 | Reddy et al. |
| 2015/0027703 A1* | 1/2015 | Zhu .......................... C09K 8/68 507/230 |
| 2017/0043499 A1* | 2/2017 | Forgeron ............ B01F 23/2319 |

FOREIGN PATENT DOCUMENTS

| | | |
|---|---|---|
| EP | 2810925 A1 | 12/2014 |
| WO | 9117875 A1 | 11/1991 |
| WO | 2016061251 A1 | 4/2016 |
| WO | 2020206011 A1 | 10/2020 |
| WO | 2023069179 A1 | 4/2023 |

OTHER PUBLICATIONS

International Search Report and Written Opinion Issued in Corresponding Application No. PCT/US2023/030859, mailed on Dec. 15, 2023, 24 pages.

Final Office Action issued for corresponding U.S. Appl. No. 17/821,436, mailed May 22, 2024 (18 pages).

* cited by examiner

METHOD OF REACTING CO2 BY EMULSIFYING CONCRETE AND USE IN OILWELL CEMENTING

BACKGROUND

Carbon dioxide ($CO_2$) is the most commonly produced greenhouse gas and a contributor to global climate change. Capturing and reacting $CO_2$ into solid carbonates is one of the most effective methods of reducing the amount of carbon dioxide in the atmosphere with the goal of reducing global climate change.

Recent efforts have been directed toward curing concrete in a $CO_2$ environment to make use of the cement hydration byproduct $Ca(OH)_2$ to form $CaCO_3$ in an effort to react/remove atmospheric $CO_2$. Conventional cement curing processes involve treating a cement composition with steam, optionally in an atmospheric $CO_2$ containing environment. This process is rate limited by the diffusion of $CO_2$ gas penetrating through cement from the outer surface to the center. The major disadvantage of the conventional process is that the process is diffusion limited and therefore, slow. Further, the process in inefficient as only a small percentage of $CO_2$ provided during the curing can be reacted into the curing cement.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a concrete emulsion comprising a cement, aggregate, water, and carbon dioxide. In one or more embodiments, the carbon dioxide is liquid or super critical and dispersed in the cement emulsion composition.

In another aspect, embodiments disclosed herein relate to a method of producing a concrete emulsion composition. Methods include mixing a cement, aggregate, and water to form a hydrated concrete composition, and emulsifying the hydrated concrete composition with liquid or supercritical $CO_2$.

In another aspect, embodiments disclosed herein relate to articles formed from or comprising the concrete emulsion composition.

In another aspect, embodiments disclosed herein relate to a method of treating a wellbore, comprising mixing a cement, aggregate, and water to form a hydrated concrete composition, and emulsifying the hydrated concrete composition with liquid or supercritical $CO_2$ and pumping the concrete emulsion composition into the wellbore.

In yet another aspect, embodiments disclosed herein relate to a method of manufacturing an article. Methods include mixing a cement, aggregate, and water to form a hydrated concrete composition, and emulsifying the hydrated concrete composition with liquid or supercritical $CO_2$ and 3D printing the concrete emulsion composition to produce the article.

Other aspects and advantages of the claimed subject matter will be apparent from the following description and the appended claims.

DETAILED DESCRIPTION

Figure 1:
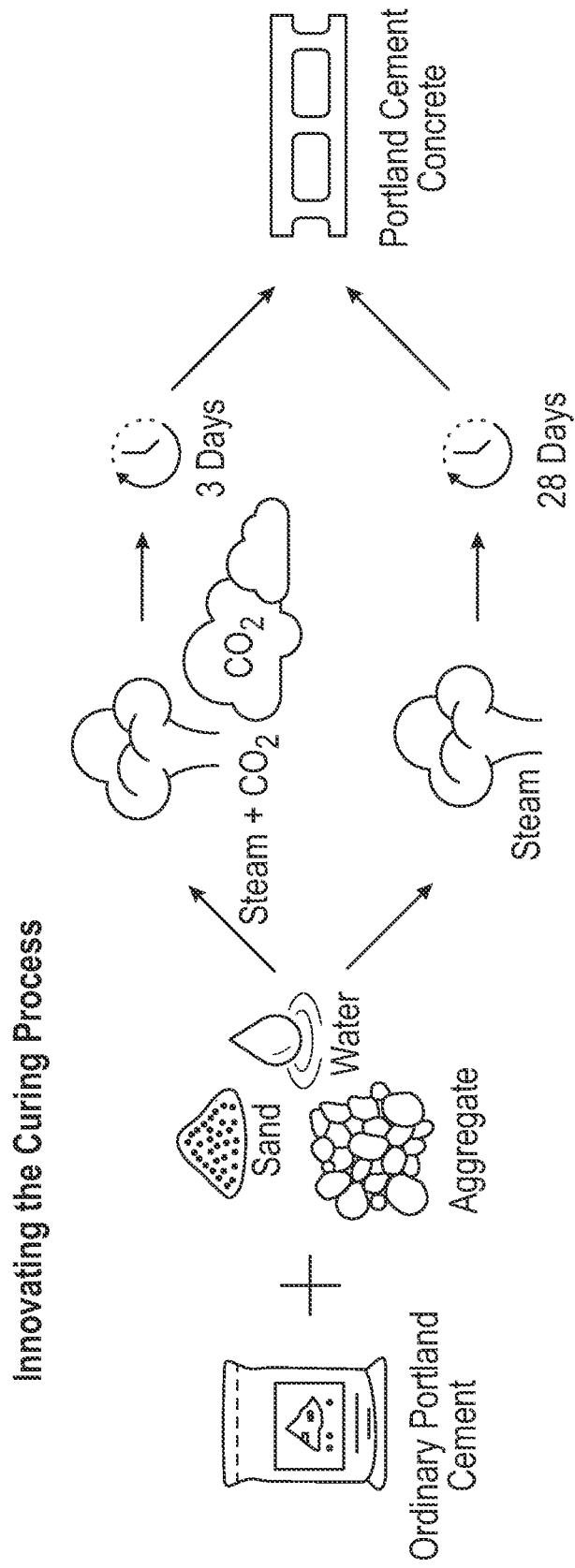
FIG. 1 is a schematic of conventional steam and carbon dioxide cement curing processes.
Figure 2:
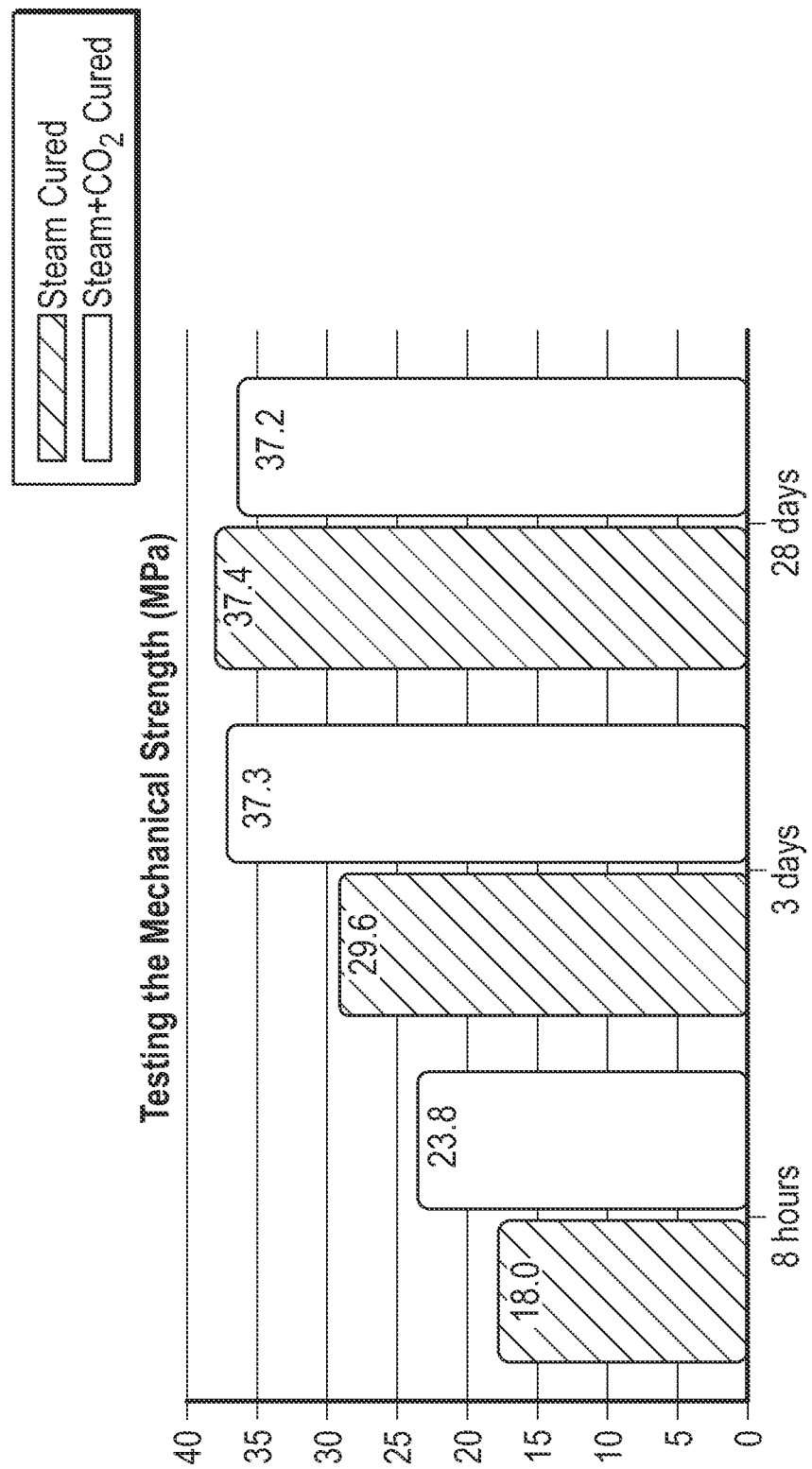
FIG. 2 is a comparison of the compressive strength of steam-cured cement vs steam- and $CO_2$-cured concrete.

Embodiments of the present disclosure generally relate to concrete emulsion compositions which are advantageously cured by emulsifying with liquid or supercritical carbon dioxide. Herein, concrete emulsion refers to a composition comprising at least a cementious continuous and a liquid or supercritical dispersed phase. The cementious phase may comprise sand or other aggregates and thus be a concrete phase. The diffusion of gaseous carbon dioxide into a hydrated concrete mixture is a slow and inefficient process for curing a concrete composition. Dispersing liquid or supercritical carbon dioxide homogeneously throughout a concrete emulsion via an emulsifying process and maintaining the composition under sufficient pressure enhances the curing process. FIG. 1 illustrates a general process for the production of a hydrated concrete composition from at least a cement, aggregate, and water and subsequently curing the concrete compositions. Compositions cured via steam-only require significantly longer cure times. Further, carbon dioxide-reactive additives may be introduced to improve properties of the cured concrete, such as the storage modulus or the elastic-storage component of the shear modulus. Concrete emulsion compositions according to embodiments of the present disclosure may also be 3D printed or pumped downhole for use in a wellbore.

Concrete Emulsion Composition

Embodiments disclosed herein relate to a concrete emulsion composition comprising a cement, aggregate, water, and liquid or supercritical carbon dioxide. The cement is not particularly limited and may be a Portland or non-Portland cement. The cement may be, for example, a Class G or Class H cement when used downhole. Examples of suitable cements may include but are not limited to Portland, high-alumina, Sorel, and geopolymeric cements. In one or more embodiments, the amount of cement may have a lower limit of 20%, 30%, 40%, or 50% and an upper limit of 50%, 60% or 70% by total weight of the composition, where any lower limit may be used in combination with any upper limit.

The aggregate is not particularly limited and may be a sand, gravel, or stone. The aggregate may be, for example, Saudi Sand. In one or more embodiments, the amount of aggregate may have a lower limit of 20%, 30%, 40%, or 50% and an upper limit of 50%, 60%, 70%, 80%, or 90% by total weight of the composition, where any lower limit may be used in combination with any upper limit.

The cement is hydrated with water and upon hydration forms calcium hydroxide, $Ca(OH)_2$. The water may comprise salts, metals, organics, or other common impurities. In one or more embodiments, the amount of water may have a lower limit of 1%, 2%, 5%, 7%, 10%, 15%, 20%, 30%, or 40% and an upper limit of 30%, 40%, 50%, 60%, 70% or 80% by total weight of the composition, where any lower limit may be used in combination with any upper limit.

The calcium hydroxide formed from hydration of the cement is reacted with carbon dioxide to form calcium carbonate, $CaCO_3$. To maintain the dispersion of the carbon dioxide throughout the composition, the composition is maintained during cure at a pressure and temperature sufficient to ensure the carbon dioxide remains liquid or supercritical. In one or more embodiments, the amount of carbon dioxide may have a lower limit of 1%, 2%, 3%, 5%, 7.5%, 10%, 12.5%, 15%, or 20%, and an upper limit of 15%, 20%, 25%, 30%, 40%, 50%, 60%, 70%, 80%, or 90% by total weight of the composition, where any lower limit may be used in combination with any upper limit.

In one or more embodiments, concrete emulsion compositions according to the present disclosure may comprise one or more additives. Additives according to the present disclosure may include, but are not limited to crystalline silica, dispersants, retarders, surfactants, fluid loss control compounds, viscosifiers, weighting agents, $CO_2$ reactive compounds, and combinations thereof.

Crystalline Silica

In embodiments, the concrete emulsion composition may comprise crystalline silica for high temperature applications. Crystalline silica may be used when the composition is to be used in temperatures exceeding a lower limit of 110° C. The size and distribution of the crystal silica particles used may vary widely, and in some embodiments may have an average size ranging from a lower limit of any one of 100 nm, 200 nm, 300 nm, 400 nm, 500 nm, 1 µm, 10 µm, 25 µm, and 50 µm, to an upper limit of any one of 800 nm, 1 µm, 2 µm, 5 µm, 10 µm, 25 µm, 50 µm, 75 µm, and 100 µm, where any lower limit may be used in combination with any appropriate upper limit. In one or more embodiments, the amount of crystalline silica used may have a lower limit of 5%, 10%, 20%, or 30% and an upper limit of 40%, 50%, 60%, or 70% by total weight of concrete, where any lower limit may be used in combination with any upper limit.

Dispersants

In embodiments, the concrete emulsion composition may comprise dispersants. Dispersants, or friction reducers, may be used to modify or improve the rheological properties of the concrete emulsion composition. Dispersants may be lignosulfonates, melamine-formaldehydes, or polycarboxylates. Examples of suitable dispersants may include but are not limited to polycarboxylate ether, such as Ethacryl G™ manufactured by Coatex, USA; or NC-S-1, SC-8, and SC-9 from Fritz Industries. In one or more embodiments, the amount of dispersants used may have a lower limit of 0.1%, 0.5%, 1% or 2% and an upper limit of 3%, 4%, or 5% by total weight of concrete, where any lower limit may be used in combination with any upper limit.

Retarders

In embodiments, the concrete emulsion composition may comprise retarders. Retarders may be used to delay the cure, or hardening, of the concrete emulsion composition. Retarders may be lignosulfonates, or AMPS-AA (co-polymer of 2-acrylamido-2-methylpropane sulfonic acid and acrylic acid) or AMPS-AA-IA (co-polymer of 2-acrylamido-2-methylpropane sulfonic acid, acrylic acid and itaconic acid) polymer. Examples of suitable retarders may include but are not limited to FR-1, FR-2, PCR-3, PCR-4, SR-I from Fritz Industries. In one or more embodiments, the amount of retarders used may have a lower limit of 0.1%, 0.5%, 1% or 2% and an upper limit of 3%, 4%, or 5% by total weight of concrete, where any lower limit may be used in combination with any upper limit.

Accelerators

In embodiments, the concrete emulsion composition may comprise accelerators. Accelerators may be used to increase the rate of curing, and speed hardening, of the concrete emulsion composition. Accelerators may include $CaCl_2$ and NaCl. In one or more embodiments, the amount of accelerators used may have a lower limit of 0.1%, 0.5%, 1% or 2% and an upper limit of 3%, 4%, or 5% by total weight of concrete, where any lower limit may be used in combination with any upper limit.

Surfactants

In embodiments, the concrete emulsion composition may comprise surfactants. Surfactants may be used to stabilize the dispersed phase and improve emulsification of the carbon dioxide. Surfactants used may be traditional, $CO_2$-philic, or $CO_2$-reactive molecules. Particularly, $CO_2$-philic surfactants may improve dispersion uniformity. Suitable surfactants may be anionic, cationic, or non-ionic. Examples of suitable surfactants may include but are not limited to sodium dodecyl sulfate (SDS), sodium lauryl sulfate (SLS), sodium lauryl ether sulfate (SLES), alcohol ethoxy sulfate (AES), alpha olefin sulfonate (AOS), sodium oleate, sulphanol, cetyltrimethyl ammonium bromide (CTAB), cetrimide, neopor, microair, cocodiethanolamide (CDA), or hydrolyzed protein such as albumin. In one or more embodiments, the amount of surfactants used may have a lower limit of 0.1%, 0.5%, 1%, 2%, 3%, 4%, or 5% and an upper limit of 6%, 7%, 8%, 9%, or 10% by total weight of concrete, where any lower limit may be used in combination with any upper limit.

Fluid Loss Control Compounds

In embodiments, the concrete emulsion composition may comprise fluid loss control compounds. Fluid loss control compounds may be used to maintain a suitable liquid/solid ratio in the concrete emulsion composition. Examples of suitable fluid loss control compounds may include but are not limited to AMPS-NNDMA (co-polymer of 2-acrylamido-2-methylpropane sulfonic acid and N,N dimethyl acrylamide) and AMPS-NNDMA-AA (co-polymer of 2-acrylamido-2-methylpropane sulfonic acid, N,N dimethyl acrylamide and acrylic acid) polymers. In one or more embodiments, the amount of fluid loss control compounds used may have a lower limit of 0.1%, 0.5%, 1% or 2% and an upper limit of 3%, 4%, or 5% by total weight of concrete, where any lower limit may be used in combination with any upper limit.

Viscosifiers

In embodiments, the concrete emulsion composition may comprise viscosifiers. Viscosifiers may be used to increase the viscosity of the concrete emulsion composition. Examples of suitable viscosifiers may include but are not limited to hydroxyethyl cellulose (HEC) and diutane. In one or more embodiments, the amount of viscosifiers used may have a lower limit of 0.1%, 0.5%, 1% or 2% and an upper limit of 3%, 4%, or 5% by total weight of concrete, where any lower limit may be used in combination with any upper limit.

Weighting Agents

In embodiments, the concrete emulsion composition may comprise weighting agents. Weighting agents may be high-density materials used for increasing the density of the concrete emulsion composition. Examples of suitable weighting agents may include but are not limited to iron oxide, manganese oxide, barium sulfate, and bentonite clays. In one or more embodiments, the amount of weighting agents used may have a lower limit of 5%, 10%, 20%, 30%, 40%, or 50% and an upper limit of 50%, 70%, 90%, 110%, 130%, or 150% by total weight of concrete, where any lower limit may be used in combination with any upper limit.

$CO_2$ Reactive Compounds

In embodiments, the concrete emulsion composition may comprise $CO_2$ reactive compounds. $CO_2$ reactive compounds may be either organic or inorganic compounds or materials. Organic materials such as miktoarm star polymers may self-assemble to form micelles in water upon hydration and transform into nanoribbons upon exposure to $CO_2$. The inclusion of such polymers can reinforce the elastic-storage component of the shear modulus of the concrete emulsion and aid in $CO_2$ uptake in the concrete emulsion. Inorganic compounds reactive with $CO_2$ may also aid in the uptake of $CO_2$ in the concrete emulsion. Examples of suitable $CO_2$ reactive compounds may include but are not limited to star-[poly(ethylene glycol)-polystyrene-poly[2-(N,N-diethylamino)ethyl methacrylate]]($\mu$-PEG-PS-PDEA), calcium hydroxide ($Ca(OH)_2$), magnesium oxide (MgO), and forsterite ($Mg_2SiO_4$). In one or more embodiments, the amount of $CO_2$ reactive compounds used may have a lower limit of 5%, 10%, 20%, or 30% and an upper limit of 40%, 50%, 60%, or 70% by total weight of concrete, where any lower limit may be used in combination with any upper limit.

In one or more embodiments, upon combination of the appropriate components detailed above, the composition may be mixed with liquid or supercritical carbon dioxide via an emulsifying process to form a concrete emulsion composition. The concrete emulsion composition may have a density of 30 to 60 kg/m 3.

In one or more embodiments, the concrete emulsion composition may be maintained at a temperature and pressure sufficient to maintain the carbon dioxide in a liquid or supercritical state to form a cured concrete composition. Cured concrete compositions according to the present disclosure may have a compressive strength of at least 23 MPa after 8 hours, and of at least 37 MPa after 3 days. Cured concrete compositions according to the present disclosure may have a density of 16 to 30 ppg.

Method of Producing a Concrete Emulsion Composition

Figure 3:
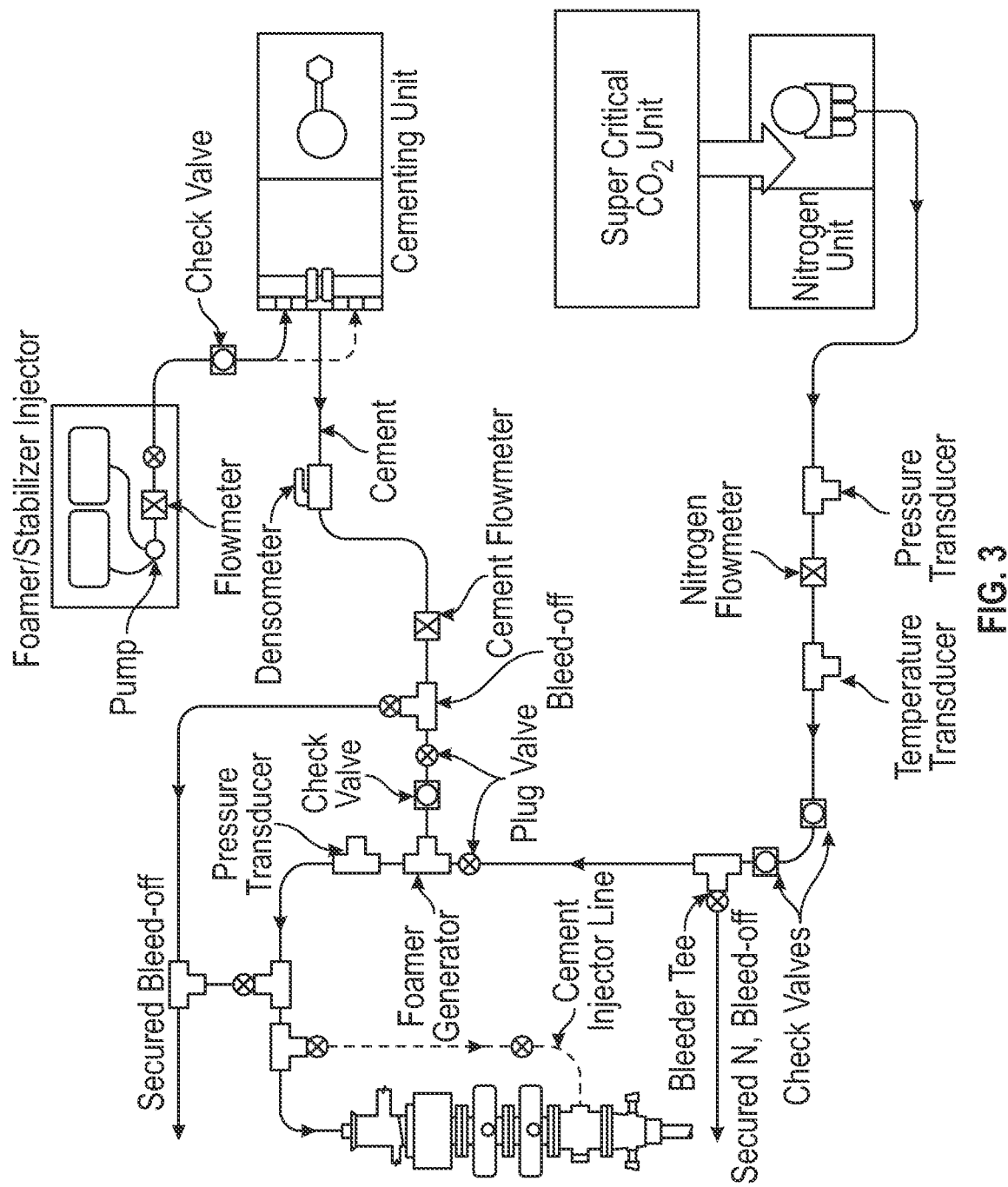
FIG. 3 is a diagram of an apparatus for the production of a concrete emulsion composition.

Embodiments according to the present disclosure relate to a method of producing a concrete emulsion composition. Generally, the concrete and dry additives are dry blended to form a dry blend. The liquid additives are mixed with the water. The dry blend is mixed with the water to form a hydrated concrete composition. Referring to FIG. 3, the dry blend may be provided in a cementing unit 1. To the cementing unit may be added the liquid components to form the hydrated concrete composition. The super critical carbon dioxide may be provided by a supercritical carbon dioxide unit 2. The hydrated concrete composition and the supercritical carbon dioxide are each flowed to an emulsion generator 3 and mixed. Mixing may be performed with a high speed (greater than 1000 RPM) mechanical blender that works under pressure. The hydrated concrete composition is emulsified with compressed $CO_2$ in the emulsion generator 3 to achieve the desired concrete emulsion composition density.

Method of Treating a Wellbore

Embodiments according to the present disclosure relate to a method of treating a wellbore with a concrete emulsion composition. A concrete emulsion composition is produced according to the method detailed above. Once the desired concrete emulsion density is achieved, the concrete emulsion composition is pumped downhole into a wellbore. The concrete emulsion composition is maintained at a temperature and pressure sufficient to maintain the carbon dioxide in a liquid or supercritical state until the concrete emulsion composition is cured.

Article

Embodiments according to the present disclosure relate to articles comprising the concrete emulsion composition. Articles may be formed entirely or partly of the concrete emulsion composition and allowed to cure to form a desired article. Examples may include, but are not limited to bricks, concrete structures, and specially designed patterns for surface or downhole use.

Method of Producing an Article

Embodiments according to the present disclosure relate to a method of producing an article. In one or more embodiments the concrete emulsion composition is produced according to embodiments of the present disclosure. The concrete emulsion composition may be provided in a 3D printing apparatus to be 3D printed. A high-pressure 3D printer, in which $CO_2$ gas/liquid is emulsified under pressure using a high-speed mechanical blender before entering into the 3D printing tip may be used. The concrete emulsion composition may be extruded from the 3D printing apparatus into an ambient atmosphere. According to one or more embodiments, the concrete emulsion composition may be 3D printed under sufficient temperature and pressure to maintain the carbon dioxide in a liquid or supercritical state. In both the ambient and pressurized embodiments, the presence of water may assist in the kinetics of the lime-carbonation reaction. Water may be included with the carbon dioxide to improve the curing reaction.

EXAMPLES

Example 1

A concrete emulsion composition was prepared according to embodiments of the present disclosure comprising:
Class A Cement—598 g
Saudi Sand—1455 g
Water—170 g
Superplasticizer—4.78 g
Foaming agent—5.98 g
Liquid $CO_2$—89.102 g
The concrete emulsion composition was cured at 100° F. and 1000 psi.
The cured concrete composition exhibited a compressive strength of 23 MPa after 8 hrs, 37 MPa after 3 days, and 37.2 MPa after 28 days.

Comparative Example 1

A concrete emulsion composition was prepared according to Example 1, except the composition was steam cured.
Class A Cement—598 g
Saudi Sand—1455 g
Water—170 g
Superplasticizer—4.78 g
The steam-cured concrete composition was cured at 100° F. and 1000 psi.
The steam-cured concrete composition exhibited a compressive strength of 18.0 MPa after 8 hrs, 29.6 MPa after 3 days, and 37.4 MPa after 28 days.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A concrete emulsion composition comprising:
   a concrete continuous phase comprising:
   a cement,
   water, and
   aggregate; and
   a dispersed carbon dioxide phase, wherein the carbon dioxide is liquid or supercritical and dispersed in the concrete emulsion composition.

2. The concrete emulsion composition according to claim 1, wherein the cement is selected from the group consisting of Class G and Class H cement.

3. The concrete emulsion composition according to claim 1, wherein the aggregate is sand.

4. The concrete emulsion composition according to claim 1, further comprising additives selected from the group consisting of crystalline silica, dispersants, retarders, surfactants, fluid loss control compounds, viscosifiers, weighting agents, $CO_2$ reactive compounds, accelerators, and combinations thereof.

5. The concrete emulsion composition according to claim 1, wherein the cement is present in an amount of 20% to 70% by total weight of the composition.

6. The concrete emulsion composition according to claim 1, wherein the aggregate is present in an amount of 20% to 90% by total weight of the composition.

7. The concrete emulsion composition according to claim 1, wherein the water is present in an amount of 30% to 80% by total weight of the composition.

8. The concrete emulsion composition according to claim 1, wherein the carbon dioxide is present in an amount of 1% to 90% by total weight of the composition.

9. The concrete emulsion composition according to claim 4, wherein the crystalline silica is present in an amount of 5% to 70% by weight of concrete.

10. The concrete emulsion composition according to claim 4, wherein the dispersants are present in an amount of 0.1% to 5% by weight of concrete.

11. The concrete emulsion composition according to claim 4, wherein the retarder is present in an amount of 0.1% to 5% by weight of concrete.

12. The concrete emulsion composition according to claim 4, wherein the surfactant is present in an amount of 1% to 10% by weight of concrete.

13. The concrete emulsion composition according to claim 4, wherein the fluid loss control compounds are present in an amount of 0.1% to 5% by weight of concrete.

14. The concrete emulsion composition according to claim 4, wherein the viscosifier is present in an amount of 0.1% to 5% by weight of concrete.

15. The concrete emulsion composition according to claim 4, wherein the weighting agent is present in an amount of 5% to 150% by weight of concrete.

16. The concrete emulsion composition according to claim 1, wherein the concrete emulsion composition is cured.

17. The concrete emulsion composition according to claim 16, wherein the cured concrete composition has a compressive strength of at least 18 MPa after 8 hours.

18. A method for producing the concrete emulsion composition according to claim 1, the method comprising:
    mixing a cement, aggregate, and water to form a hydrated concrete composition; and
    emulsifying the hydrated concrete composition with liquid or supercritical $CO_2$.

19. The method according to claim 18, wherein the hydrated concrete composition further comprises additives selected from the group consisting of crystalline silica, dispersants, retarders, surfactants, fluid loss control compounds, viscosifiers, weighting agents, $CO_2$ reactive compounds, and combinations thereof.

20. The method according to claim 18, wherein the method is performed at a temperature of 10 to 40° C.

21. The method according to claim 18, wherein the method is performed at a pressure of 14 psi to 3000 psi.

22. An article formed from the concrete emulsion composition according to claim 1.

23. The article according to claim 22, wherein the article is selected from the group consisting of bricks and concrete structures.

24. A method of treating a wellbore, the method comprising the steps of:
    Mixing a cement, aggregate, and water to form a hydrated concrete composition; and
    emulsifying the hydrated concrete composition with supercritical $CO_2$ to form the concrete emulsion composition of claim 1; and
    pumping the concrete emulsion composition into the wellbore.

25. A method of manufacturing an article, the method comprising the steps of:
    Mixing a cement, aggregate, and water to form a hydrated concrete composition; and
    emulsifying the hydrated concrete composition with supercritical $CO_2$ to form the concrete emulsion composition of claim 1; and
    3D printing the concrete emulsion composition to produce the article.

* * * * *